(12) United States Patent
Humphry et al.

(10) Patent No.: US 10,679,038 B2
(45) Date of Patent: Jun. 9, 2020

(54) METHOD AND APPARATUS FOR DETERMINING TEMPORAL BEHAVIOUR OF AN OBJECT IN IMAGE DATA

(71) Applicant: PHASE FOCUS LIMITED, Sheffield (GB)

(72) Inventors: Martin James Humphry, Nottingham (GB); Kevin Langley, Sheffield (GB); James Russell, Nottingham (GB)

(73) Assignee: PHASE FOCUS LIMITED, Sheffield (GB)

( * ) Notice: Subject to any disclaimer, the term of this patent is extended or adjusted under 35 U.S.C. 154(b) by 269 days.

(21) Appl. No.: 15/569,637

(22) PCT Filed: Apr. 29, 2016

(86) PCT No.: PCT/GB2016/051252
§ 371 (c)(1),
(2) Date: Oct. 26, 2017

(87) PCT Pub. No.: WO2016/174472
PCT Pub. Date: Nov. 3, 2016

(65) Prior Publication Data
US 2018/0357468 A1 Dec. 13, 2018

(30) Foreign Application Priority Data

Apr. 30, 2015 (GB) .................................. 1507454.5
Mar. 2, 2016 (GB) .................................. 1603649.3

(51) Int. Cl.
*G06K 9/00* (2006.01)
*G06T 7/55* (2017.01)
(Continued)

(52) U.S. Cl.
CPC ....... *G06K 9/00147* (2013.01); *G06K 9/6202* (2013.01); *G06T 7/246* (2017.01);
(Continued)

(58) Field of Classification Search
None
See application file for complete search history.

(56) References Cited

U.S. PATENT DOCUMENTS

2006/0072817 A1 4/2006 Lee et al.
2010/0002929 A1* 1/2010 Sammak ............ G06K 9/00127
382/133
(Continued)

FOREIGN PATENT DOCUMENTS

AU 2011265340 A1 7/2013
WO 02061423 A2 8/2002
(Continued)

OTHER PUBLICATIONS

Official Communication of the European Patent Office from corresponding EP Application Serial No. 16721476.6 dated Sep. 24, 2019.
(Continued)

*Primary Examiner* — Tahmina N Ansari
(74) *Attorney, Agent, or Firm* — Lando & Anastasi, LLP (57) ABSTRACT

Embodiments of the present invention provide a computer-implemented method of determining temporal behaviour of an object, comprising receiving image data comprising data representing a plurality of images, at least some of the images comprising one or more cells, determining a plurality of characteristics of at least one feature in each of one or more of the plurality of images, determining a confidence value representing a confidence that one of the cells in a first one of the plurality of images corresponds to a feature in a second one of the plurality images, wherein the confidence value is based upon the characteristics of the feature in the second image and the characteristics of the cell, and identifying the cell in the second one of the plurality of images based upon the confidence value.

31 Claims, 5 Drawing Sheets

(51) Int. Cl.
   *G06T 7/246* (2017.01)
   *G06K 9/62* (2006.01)
   *G06T 7/62* (2017.01)
   *G06T 7/73* (2017.01)
(52) U.S. Cl.
   CPC ............... *G06T 7/248* (2017.01); *G06T 7/55* (2017.01); *G06T 7/62* (2017.01); *G06T 7/74* (2017.01); *G06T 2207/10056* (2013.01); *G06T 2207/30024* (2013.01)

(56) References Cited

U.S. PATENT DOCUMENTS

| | | |
|---|---|---|
| 2012/0321172 A1 | 12/2012 | Jachalsky et al. |
| 2013/0176430 A1 | 7/2013 | Zhu et al. |
| 2013/0182893 A1 | 7/2013 | Lavender et al. |
| 2014/0028824 A1 | 1/2014 | Kubo et al. |
| 2014/0050405 A1* | 2/2014 | Del Amo ............ G06K 9/6265 382/191 |
| 2014/0247972 A1* | 9/2014 | Wang ............ G06K 9/6227 382/133 |
| 2015/0131889 A1 | 5/2015 | Aragaki |
| 2018/0357468 A1* | 12/2018 | Humphry ............ G06T 7/246 |

FOREIGN PATENT DOCUMENTS

| | | |
|---|---|---|
| WO | 2005106531 A1 | 11/2005 |
| WO | 2010064051 A1 | 6/2010 |

OTHER PUBLICATIONS

Anonymous, "Arithmetic Mean", Wikipedia, pp. 1-5, X905562281 (Feb. 12, 2015).
Anonymous, "Weighted Geometric Mean", Wikipedia, XP055622892 (Feb. 28, 2013).
International Search Report and the Written Opinion of the International Searching Authority from corresponding PCT/GB2016/051252 dated Jul. 29, 2016.
International Preliminary Report on Patentability and Written Opinion of the International Searching Authority from corresponding PCT/GB2016/051252 dated Oct. 31, 2017.
Jun Xie et al., "Automatic Tracking of *Escherichia coli* in Phase-Contrast Microscopy Video", IEEE Transactions on Biomedical Engineering, IEEE Service Center, Piscataway, NJ, USA, vol. 56, No. 2, pp. 390-399, Feb, 1, 2009, XP011342832.
Dewan M A A et al., "Tracking Biological Cells in Time-Lapse Microscopy: An Adaptive Technique Combining Motion and Topological Features", IEEE Transactions on Biomedical Enginerring, IEE Service Center, Piscataway, NJ, USA, vol. 58, No. 6, pp. 1637-1647, Jun. 1, 2011, XP011408390.
Ryoma Bise et al., "Reliable Cell Tracking by Global Data Association", 8th IEE International Symposium on Biomedical Imaging: From Nano to Macro, (ISBI 2011), IEE, U.S., pp. 1004-1010, Mar. 30, 2011. XP031944703.

* cited by examiner

METHOD AND APPARATUS FOR DETERMINING TEMPORAL BEHAVIOUR OF AN OBJECT IN IMAGE DATA

CROSS-REFERENCE TO RELATED APPLICATIONS

This application is a U.S. National Stage Application under 35 U.S.C. § 371 from International Application No. PCT/GB2016/051252, filed Apr. 29, 2016, which is hereby incorporated by reference in its entirety for all purposes, and which in turn claims priority to GB Application Serial No. 1507454.5, filed Apr. 30, 2015, and to GB Application Serial No. 1603649.3, filed Mar. 2, 2016.

FIELD OF THE INVENTION

Embodiments of the invention relate to a method and apparatus for determining the temporal behaviour of an object. In particular, some embodiments of the present invention relate to determining temporal behaviour of an object based upon features in a sequence of images taken over time. In particular, some embodiments of the invention relate to identifying and tracking objects between frames of a time-lapse sequence.

BACKGROUND

Identifying objects between one frame and another in a time-lapse sequence of images is a recognised challenge in image processing. In certain embodiments, such as tracking cells in an in-vitro cell culture, this can be made more difficult by the object's characteristics.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

In the drawings, like parts are denoted by like reference numerals.

STATEMENT OF INVENTION

According to an aspect of the present invention there is provided a method, apparatus and computer software as set forth in the appended claims.

Embodiments of the present invention are useful as marker- or label-free techniques for determining temporal behaviour of an object, or tracking the object, between a series of images. However it will be realised that embodiments may also be used with labelled techniques such as fluorescent-based techniques. The object may be one or more cells i.e. a colony of cells. In some embodiments tracking of a cell is performed whilst the cell divides into two or more cells. An ancestry of the cells may be determined i.e. the parentage of the cell.

According to an aspect of the present invention, there is provided a computer-implemented method of determining temporal behaviour of an object, comprising determining a plurality of characteristics of each of at least one feature in each of a plurality of images, determining a confidence value based upon the characteristics of a feature in a first image and the characteristics of a feature in a second image of the plurality of images, and identifying an object in at least some of the plurality of images based upon the confidence value.

According to an aspect of the present invention, there is provided an apparatus for determining the temporal behaviour of objects, comprising an image detection means for detecting radiation emitted from a radiation source, a computing device comprising a processor, and a memory, wherein the processor is arranged to perform a method according to an aspect of the invention.

According to an aspect of the present invention, there is provided computer-implemented method of determining temporal behaviour of an object, comprising receiving image data comprising data representing a plurality of images, at least some of the images comprising one or more cells, determining a plurality of characteristics of at least one feature in each of one or more of the plurality of images, determining a confidence value representing a confidence that one of the cells in a first one of the plurality of images corresponds to a feature in a second one of the plurality images, wherein the confidence value is based upon the characteristics of the feature in the second image and the characteristics of the cell; and identifying the cell in the second one of the plurality of images based upon the confidence value.

It will be appreciated that in embodiments of the invention the terms 'first image' and 'second image' and the like are not limited to the first and second images in a sequence of images. The first image may be an intermediate image in a sequence of images. Furthermore the second image may not be adjacent to the first image in the sequence of images.

Once the cell has been identified in the second one of the plurality of images, the method may be performed iteratively. In an iterative execution of the method, the method is performed for a subsequent iteration where a feature in a third image is identified as the cell in the second image. The method may be performed to identify the cell in a plurality, such as three or more images, which are not necessarily sequential images i.e. the cell may not be identified in every image in a sequence.

Embodiments of the invention may comprise determining an association between features in the first and second images if said confidence exceed a predetermined confidence value. The characteristics may be one or more of a pixel value sum, an area, an average pixel value, a radius, a circularity, a lateral position and texture characteristics of the feature. The texture characteristics may be one or more of variance, curtosis and wavelet characteristics. Optionally the confidence value may be based upon a plurality of characteristic confidence values each determined based upon a respective characteristic of the feature in the first and second images. The confidence value may be determined by a weighted geometric mean calculation based on the plurality of characteristic confidence values.

The weighted geometric mean calculation may be of the form:

$$totalConfidence = (\Pi(characteristicConfidence^w))^{1/\Sigma w}$$

Wherein w is a respective weighting factor for each of the characteristic confidences.

Embodiments of the invention may comprise determining the confidence value based upon a temporal characteristic of the feature based upon a duration of time between the first and second images. The confidence value may be inversely proportional to the duration of time.

The confidence value may be calculated according to:

$$conf = 1 - (S_T \times (|frame_1 - frame_2| - 1))$$

wherein conf is the confidence value $frame_1$ and $frame_2$ are frame numbers of the first and second images and $S_T$ is a sensitivity factor. The conf may be determined to be a value such as 0 if the calculated confidence value is negative.

The method may comprise determining the confidence value based upon a positional characteristic of the feature based upon a distance between a position of the feature in the first and second images. The confidence value based upon the positional characteristic of the feature may be based upon a size of the feature. The confidence value based upon the positional characteristic of the feature may be based upon a ratio of a distance between the feature in the first and second images and the size of the feature.

The confidence value may be calculated according to:

$$conf = \left(1 + \left(\frac{d}{S_{p2}\bar{r}}\right)^{S_{p1}}\right)^{-1}$$

wherein conf is the confidence value, $\bar{r}$ is a mean radius of the feature, d is a distance between the position of the feature in the first and second images and $S_{p1}$ is a first sensitivity factor and $S_{p2}$ is a second sensitivity factor.

Embodiments of the invention may comprise determining the confidence value based upon a ratio of a difference between the characteristic of the feature and a sum of the characteristic in the first and second images. The confidence value may be calculated according to:

$$conf = \left(1 + S_2 \left|\frac{characteristic_1 - characteristic_2}{characteristic_1 + characteristic_2}\right|^{S_1}\right)^{-1}$$

wherein conf is the confidence value, $S_1$ and $S_2$ are sensitivity factors and $characteristic_1$ and $characteristic_2$ are values of the characteristic of the feature in the first and second images. The method may comprise determining a unique association between features in the first and second images. The unique association may be determined by maximising the confidence between features. The unique association may be determined based upon a combinatorial optimization algorithm; optionally the combinatorial optimization algorithm is a Hungarian algorithm; optionally the Hungarian algorithm is a Munkres algorithm.

Embodiments of the invention may comprise determining whether a new object is present in one of the plurality of images based upon the plurality of characteristics. Embodiments of the invention may comprise determining whether an object has divided into at least first and second objects. The determining whether an object has divided may be based upon a subset of the characteristics associated with the object in the first image and at least one of first and second features in the second image. The determining whether the object has divided may comprise determining a confidence value based upon the subset of characteristics of the object in a first image and the subset of characteristics of at least one of the first and second features in the second image.

The method may comprise determining an association between the object in the first image and at least one of the first and second features in the second image if said confidence exceed a predetermined division confidence value.

Optionally the method comprises determining whether first and second objects have merged. Determining whether first and second objects have merged may be based upon a subset of the characteristics associated with the first and second objects in the first image and a feature in the second image. Embodiments of the invention may comprise determining an association between at least one of the first and second objects in the first image and the feature in the second image if said confidence exceed a predetermined merge confidence value. The subset of characteristics may be indicative of characteristics unrelated to object size. The object may be a group of a plurality of features representing a physical object. The feature may comprises a plurality of pixels in each image. The object may be a representation of a cell.

According to an aspect of the present invention, there is provided an apparatus for determining the temporal behaviour of objects, comprising an image detection means arranged detect radiation emitted from a radiation source, a computing device comprising a processor, and a memory, wherein the processor is arranged to perform a method according to an aspect of the invention.

According to an aspect of the present invention, there is provided computer software that when executed by a computer is arranged to perform method according to an aspect of the invention. The computer software may be stored on a computer-readable medium. The computer software may be tangibly stored on the computer readable medium.

According to an aspect of the present invention, there is provided a computer-readable data storage medium having instructions stored thereon which, when executed by a computer, perform a method according to an aspect of the invention.

According to an aspect of the present invention there is provided a computer-implemented method of determining temporal behaviour of an object, comprising receiving image data corresponding to a mounting means supporting one or more objects, the image data comprising a plurality of images, at least some of the images comprising the one or more objects, determining a plurality of characteristics of at least one feature in each of one or more of the plurality of images, determining a confidence value representing a confidence that one of the objects in a first one of the plurality of images corresponds to a feature in a second one of the plurality images, wherein the confidence value is based upon the characteristics of the feature in the second image of the plurality of images and the characteristics of the object, and identifying the object in the second one of the plurality of images based upon the confidence value.

DETAILED DESCRIPTION OF EMBODIMENTS OF THE INVENTION

Embodiments of the invention are arranged to determine a temporal behaviour of an object. In particular some embodiments of the invention are arranged to track objects.

This may be useful in situations where tracking via other means proves difficult and/or impossible, such as in the field of cell monitoring.

Figure 1:
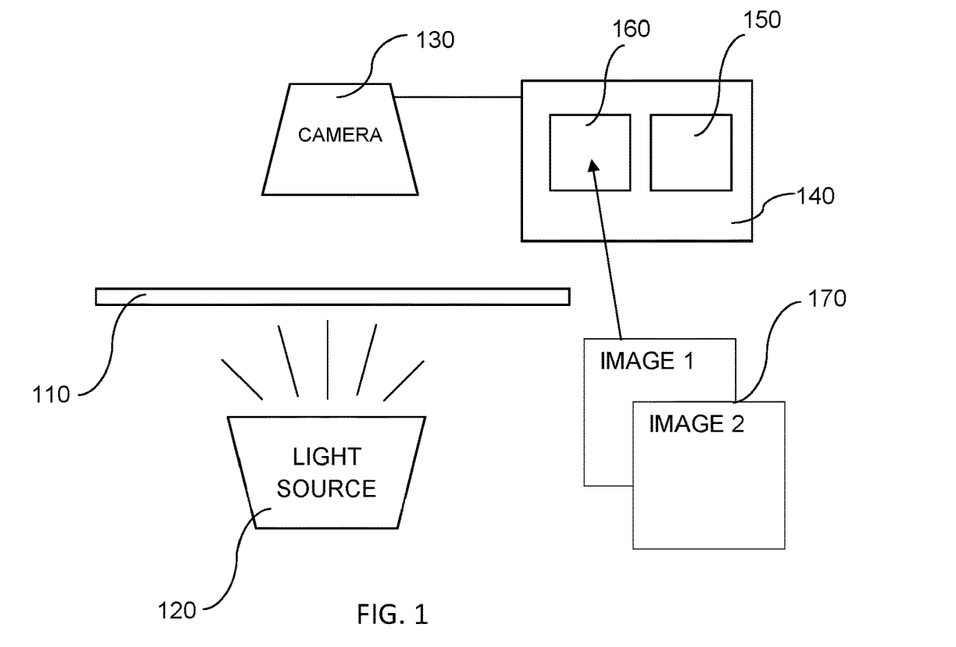
FIG. 1 is a diagram showing an apparatus according to an embodiment of the invention.

FIG. 1 is a diagram of an apparatus according to an embodiment of the invention. The apparatus comprises a mounting means 110 for supporting one or more objects in use. The mounting means 110 may comprise a slide, stage petri dish or micro-titre plate 110, upon which one or more objects are located in use. The mounting means 110 is suitable to retain the one or more objects including, in some cases, a liquid medium in which those objects, such as cells, reside.

A light source 120, or other radiation source, is used to illuminate the mounting means 110, and is located such that the radiation/light is transmitted through or reflected from the mounting means 110 and is detected by a detector 130 for detecting incident radiation. The detector 130 may be provided in the form of an image detection means 130. The image detection means 130 may be a CCD forming a camera. The image detection means 130 is arranged to output a plurality of images of the mounting means 110 over a period of time. The image detection means 130 is connected to a computing device 140. The image detection means 130 is arranged to output image data corresponding to each of the plurality of images. The computing device 140 comprises a CPU 150 and memory 160. Images captured by the image detection means 130 are stored in the memory 160 of the computing device 140 and as time progresses an image sequence 170 is created.

Figure 2:
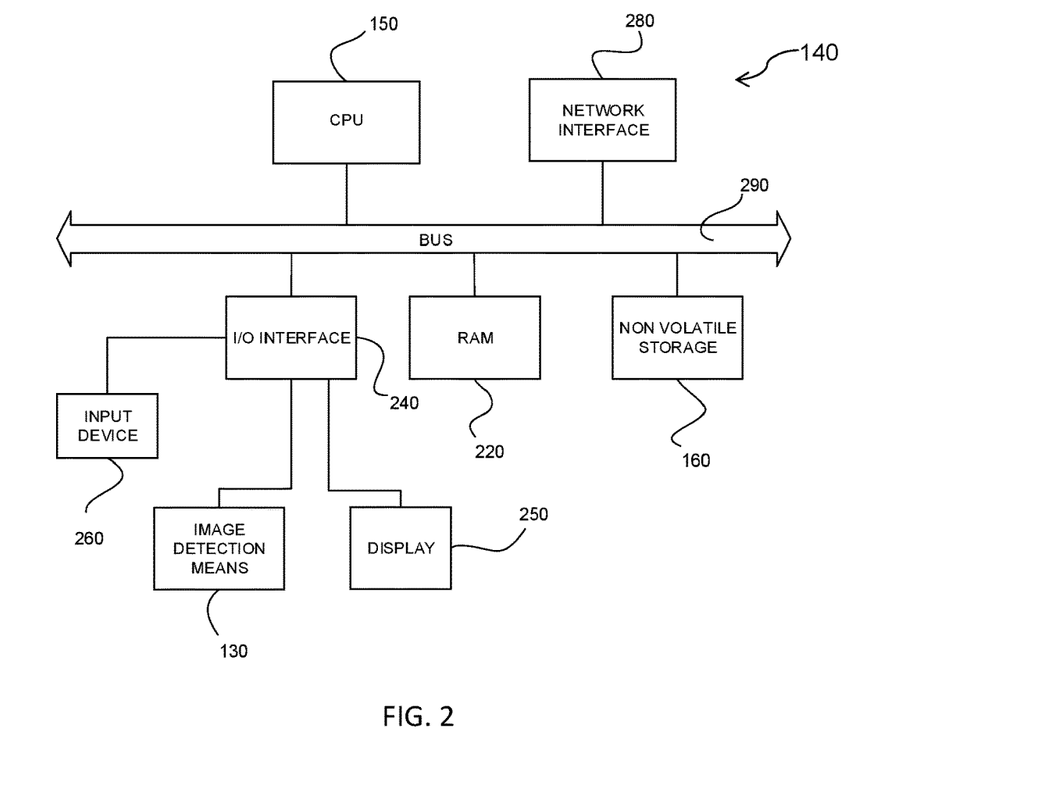
FIG. 2 is a diagram showing a further illustration of an apparatus according to an embodiment of the invention.

An example of components of the computing device 140 is now further described with reference to FIG. 2. It will be appreciated that the components of the computing device 140 in FIG. 2 are merely exemplary and the computing device 140 may comprise other components. As previously noted, the computing device 140 comprises a CPU 150 which is configured to read and execute instructions. The instructions may be stored in volatile memory 220 which may take the form of random access memory. The volatile memory 220 may store instructions for execution by the CPU 150 and data used by those instructions. In the present embodiment, the instructions stored in the volatile memory 220 are arranged to cause the CPU 150 to run a method to determine the temporal behaviour of an object according to an embodiment of the invention.

The computing device 140 further comprises the memory 160 as noted above. The memory 160 may take any appropriate form, such as a solid state drive ('SSD'), or hard disk drive ('HDD'). However it will be appreciated that other forms of memory may be appropriate.

The computing device 140 may further comprises an I/O interface 240 to which are connected input and output devices used in connection with the computing device 140. A display 250 may be provided to show visual outputs of the method. Input devices connected to the I/O interface 240 may include physical keys 260 which allow user interaction with the computing device 140. Alternatively or additionally, the display 250 may provide a touchscreen allowing a user to interact with the user interface displayed on the touchscreen. The image detection means 130 is connected to the I/O interface 240 allowing image data to be communicated to the computing device 140. In particular, the image detection means 130 allows for the image data of the slide 110 to be capture by the computing device 140 for use in the method. A network interface 280 may be provided allowing the computing device 140 to be connected to an appropriate computer network so as to receive and transmit data from and to other computing devices. In this way, the computing device 140 may receive updates or further information for use in the method. The CPU 150, volatile memory 220, memory 160, I/O interface 240, and network interface 280 are connected together via a bus 290.

Figure 3:
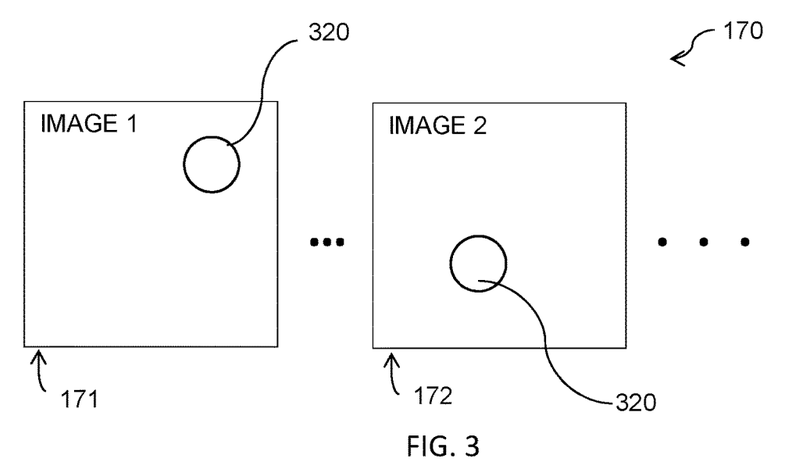
FIG. 3 is an illustration of a sequence of images generated by the apparatus of FIGS. 1 and 2.

FIG. 3 is a representation of the image sequence 170, comprising a plurality of images generated by the image detection means 130. Herein an image is a representation of image data corresponding to a two dimensional picture of at least a portion of the mounting means 110 and any objects present thereon or therein at a point in time. A plurality of images corresponding to respective points in time represent an image sequence over a period of time, wherein the period of time is between the points in time of the first and last images in the sequence. Usually, although not exclusively, the images correspond to equally spaced points in time. A frame is synonymous with the term image, particularly when the sequence of images is considered to be a video sequence comprised of a plurality of frames or images. A feature is an entity present in at least one image which may or may not be an object. An object is an object which it is desired to monitor over the period of time, such as, although not exclusively, a biological cell. The object may be a colony of cells i.e. two or more cells. An object may be uniquely identified such that each of a plurality of cells may be individually monitored in the sequence of images over a period of time.

The image sequence 170 contains images of the mounting means 110 which retains at least one object 320. Each image of the image sequence shows the object 320 on the slide 110 at a particular, respective, point in time. The object 320 may vary between images in one or more of position, size, texture, and colour as the image sequence 170 progresses. For example, as shown in FIG. 3, the object's 320 position is different in first and second images 171,172 of the sequence 170. It will be noted that the first and second images are not necessarily sequential or adjacent images in the sequence 170. It will be appreciated that a number of other characteristics of objects on the mounting means 110 may vary between images of the image sequence 170.

Figure 4:
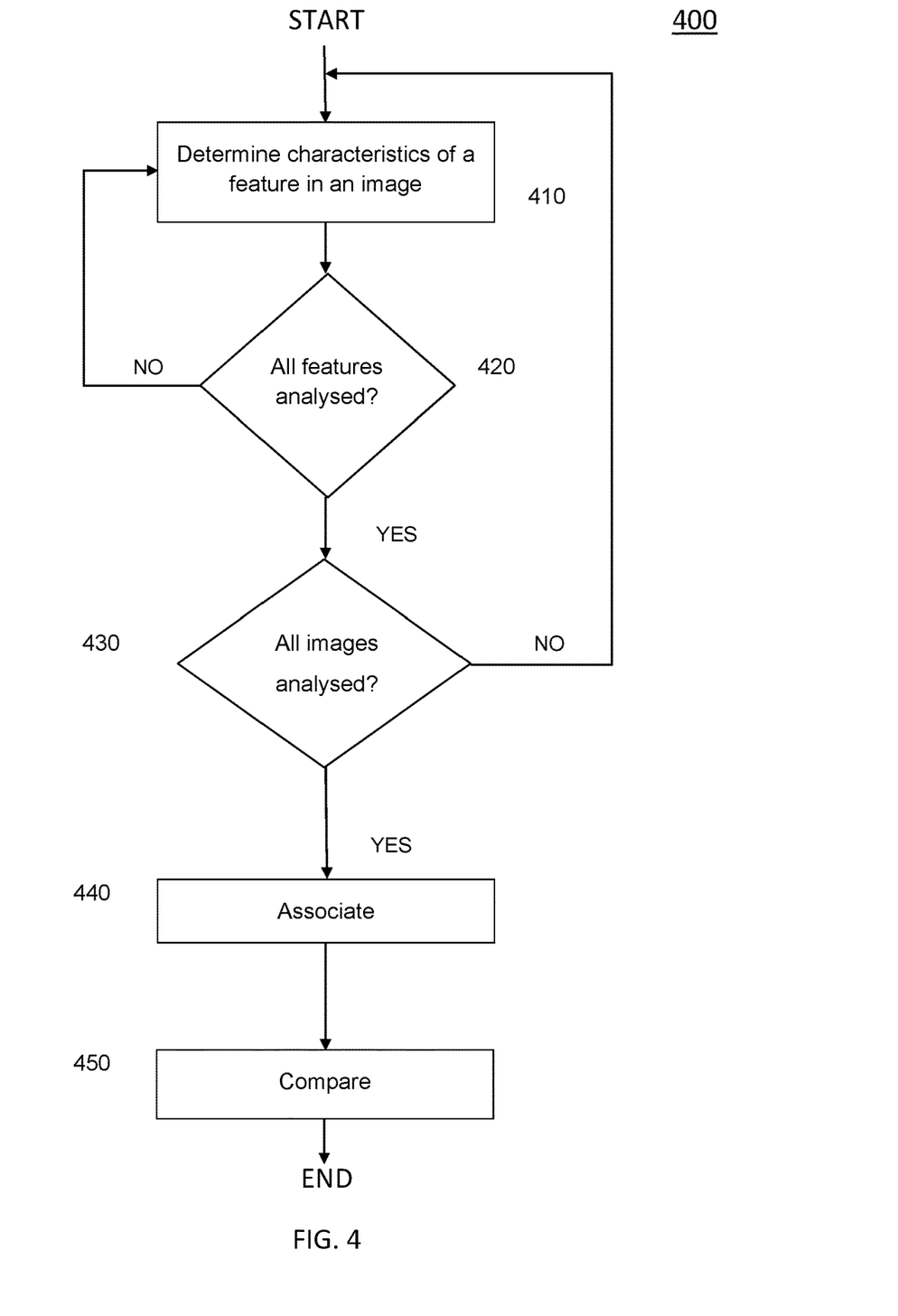
FIG. 4 is a flowchart illustrating a method according to an embodiment of the invention.

FIG. 4 is a flow chart illustrating a method 400 used in the determination of the temporal behaviour of an object according to an embodiment of the invention. The method 400 may comprise an initial or pre-processing step (not shown) of identifying features present in any images 171, 172 of a sequence of images 170. As noted above, features are entities in the images 171, 172 which may be one or more objects. The pre-processing may comprise identifying the features, for example based on a difference between the feature and a background of the image 171, 172, such as based on colour or pixel value.

Step 410 comprises determining a plurality of characteristics of each feature in an image 171, 172 of an image sequence 170 captured by the image detection means 130. Step 410 may comprise selecting a first image from a plurality of images. The first image, such as image 171, may be selected based upon a temporal order of the plurality of images. For example, the image 171 may be selected based upon a frame number associated with the image 171.

The characteristics may comprise a position of the feature, such as the feature's position within the image. The position within the image may be defined by coordinates such as (x, y) or x, y or z position. The characteristics may further comprise one or more of a total area; a pixel value sum; an average pixel value; a radius; a circularity; and information relating to texture. Texture characteristics may include any variance in texture, curtosis, which is a statistical measure of skew, and any wavelet characteristics. It will be appreciated that a number of other characteristics may be used to identify objects. The list of characteristics above is merely exemplary and it will be appreciated that other characteristics may be used.

The method 400 progresses to step 420 which comprises determining if further features in the image remain to be analysed and determining one or more of characteristics of said features. If so, the method 400 loops back to step 410 and determines the characteristics of a further feature. The further feature may be selected from amongst a plurality of features remaining in the image.

Once the one or more features in the first image, such as image 171, have been analysed and their one or more characteristics determined, the method 400 proceeds to step 430.

Step 430 comprises determining whether further images in the image sequence 170 remain to be analysed, such as image 172. If so, the method 400 loops back to step 410 and proceeds to determine the characteristics of any features in another image of the image sequence which may be an image taken at a later time than the first image 171. It will be realised that it is not necessary to analyse each image in a sequence of images. For example, alternate images in the sequence 170 may be analysed. Selection of a next image from the plurality of images may be based upon the frame number associated with each image.

Once one or more further images in the image sequence have been processed by steps 410, 420 the method 400 proceeds to step 440.

In step 440 an association between at least some features in different images is determined. A feature in one image may be associated with a feature in another image based on one or more of the determined characteristics. A feature in one image may be associated in step 440 with two or more features in the another image. That is, step 440 does not necessarily result in one-to-one associations. In some cases, where the feature has at least some similarity to two or more features in the another image, the association between the feature and the two or more features is determined.

Step 440 comprises identifying features based upon one or more of their characteristics in each image 171,172 of the image sequence 170. Over the sequence of images 170, each feature's one or more characteristics are compared and at least one confidence value is calculated based upon a relationship between the characteristics of the features in images of the image sequence. For example, the confidence value based upon the feature's position in the first and second images 171,172 is determined in some embodiments of step 440.

Step 440 may comprise selecting a first feature in a first image, such as image 171 shown in FIG. 3. It will be appreciated that the term first image is not limited to the first image in the sequence of images 170. A second feature is selected in another image representing a second image. The second image may be image 172. The second image may be a subsequent image in the sequence of images 170 i.e. an image corresponding to a later point in time, thus having a later frame number, than the first image 171. The second image is not necessarily the next image in the sequence 170 i.e. images may be skipped or omitted. At least one confidence value is determined between the first and second features. Then, a still further feature is selected i.e. a third feature is selected. The third feature may be in the same image 172 as the second feature i.e. in the second image 172, or in a yet another image, such as an image subsequent to the second image 172. At least one further confidence value is determined between the first and third features. The process of determining confidence values is repeated. The process may be repeated until confidence values are determined between all features in the sequence of selected images. The confidence values represent potential associations between the features.

Still further in step 440, 1 confidence value is compared to a predetermined threshold. If the confidence value equals or exceeds said confidence threshold, an association is determined between the features. That is, each confidence value between a pair of features is compared to the threshold. If the confidence value exceeds the threshold the association is determined between said pair of features. If the confidence value does not at least meet the threshold, the potential association between the pair of features is discarded. If the confidence value at least meets the threshold the association between the pair of features is determined.

As the method 400 proceeds, each feature may be assigned multiple associations. That is, a feature in the first image 171 may be associated with a plurality of features in the second image 172. Similarly, if a second feature in another image of the time-lapse sequence has a similar group of characteristics to those of a first feature in a previous image, and if the calculated confidence for that second feature exceeds the predetermined confidence when compared to the first feature which has already been assigned an association, the second feature may be assigned the same association. In certain embodiments the association may take the form of an identifier.

Given there are a plurality of characteristics comprising different measurements, such as the area of the feature and its position, a characteristic confidence may be calculated between corresponding characteristics of each feature. That is, the characteristic confidence value is calculated based on the same characteristics for each feature. Thus a feature may have one or more characteristic confidence values. The characteristic confidence is determined based upon the same characteristic of features in the first and second images 171,172. For example, in some embodiments a temporal characteristic for a feature may be determined to be inversely proportional to a duration of time between respective images in which the feature is present. The duration of time may be based upon frame numbers associated with each image. As such, an algorithm used to determine the corresponding characteristic confidence may be of the form:

$$\text{conf} = 1 - (S_T \times (|\text{frame}_1 - \text{frame}_2| - 1))$$

Where 'conf' is the characteristic confidence value and, 'frame$_1$' and 'frame$_2$' denote to the frame numbers of the first and second images 171,172 in the image sequence. The frame numbers may be indicative of the time duration between the images or alternatively the position of the image in the image sequence. The further apart in time the images are, the closer the calculated confidence is to 0. Should the characteristic confidence be equal to 1, this is indicates that the images are successive or adjacent images of the sequence. '$S_T$' is a predetermined sensitivity factor between 0 and 1. '$S_T$' may be set by a user and stored in a memory of the apparatus. Should '$S_T$' be set to 1, if the images are not consecutive images in the image sequence, there will be no characteristic confidence in the characteristic measured, whereas if '$S_T$' is set to 0, any number of images between the first and second images 171,172 will not affect the characteristic confidence calculated. As such, '$S_T$' controls a speed of a reduction in the characteristic confidence value or sensitivity of the characteristic confidence value to the time between the images. Therefore, in some embodiments, the further apart in time the images are, the closer the calculated characteristic confidence is to 0. In some embodiments, should the calculation result in a negative confidence, the characteristic confidence is set to 0.

Other characteristics may relate to the position of the feature in the first and second images 171,172. A characteristic confidence based upon a positional characteristic may be calculated in relation to the size of the feature. Furthermore, the characteristic confidence may also be based upon a ratio of a distance between the feature in the first and second images 171,172 and the size of the feature. In some embodiments the characteristic confidence of a positional characteristic may be calculated by an algorithm of the form:

$$conf = \left(1 + \left(\frac{d}{S_{p2}\bar{r}}\right)^{S_{p1}}\right)^{-1}$$

Where 'conf' is the characteristic confidence value, '$\bar{r}$' relates to a mean radius of the features represented in each of the first and second images 171,172 and 'd' relates to the distance between positions of the features in the first and second images 171,172. '$S_{p1}$' and '$S_{p2}$' relate to the sensitivity of the transition between the two images, wherein '$S_{p1}$' relates to a first sensitivity factor, which may relate to the how quickly the confidence value decreases, and '$S_{p2}$' relates to a second sensitivity which may relate to the point at which the confidence value falls below 0.5 (i.e. the point at which it is less likely the feature in the first image 171, is the same as the feature in the second image 172).

For other characteristics, a characteristic confidence may be calculated based upon a ratio of the difference between the characteristics of the feature and a sum of the characteristics in the first and second images 171,172. In some embodiments, for characteristics of the same type a characteristic confidence may be calculated by an algorithm of the form:

$$conf = \left(1 + S_2 \left|\frac{characteristic_1 - characteristic_2}{characteristic_1 + characteristic_2}\right|^{S_1}\right)^{-1}$$

Where 'conf' is the characteristic confidence value and '$S_1$' and '$S_2$' define sensitivities for controlling a rate at which the confidence decreases. As with the other confidence calculations, should the resulting confidence be negative, the confidence may be set to 0.

To calculate a total or combined confidence for the feature in the first and second images 171,172 a weighted geometric mean algorithm may be used. The algorithm may be of the form:

totalConfidence=$(\Pi(characteristicConfidence^w))^{1/\Sigma w}$

Where 'w' is a predetermined weighting for each characteristic and the capital $\pi$ symbol represents a weighted geometric mean operation. 'w' may be the same for each characteristic or may differ between characteristics. Varying 'w' allows one characteristic to be determined to be more or less important than another characteristic when determining the total confidence. The total or combined confidence value will be appreciated to be based on a plurality of characteristic confidence values between features. The total or combined confidence value may be that which is compared against the threshold in step 440 to determine the association between features, as discussed above.

It will be appreciated that other techniques may be used to determine characteristic confidence values based each characteristic of features.

Once features in the first and second images 171,172 have been associated, such as being assigned one or more identifiers based upon their calculated confidences, the method 400 proceeds to step 450.

Step 450 comprises determining a one-to-one association based upon the calculated total confidences for each feature, so that each feature in the first image 171 is associated with a single feature in the second image 172. A technique based upon a combinatorial optimization algorithm may be used to ensure a one-to-one association of features in the first and second images 171,172. One such technique is the Hungarian algorithm and in certain embodiments the Hungarian algorithm may be a Munkres algorithm. If a feature in subsequent images of the image have the same association, it is determined that the feature may represent the same object. If a feature does not appear to represent an already existing object (i.e. the identifier does not appear to represent a feature in previous images of the image sequence) it may be determined that the feature is new object in the image. As a result of step 450, a feature in a plurality of images is associated and determined to be an object at different points in time corresponding to each of the plurality of images.

Figure 7:
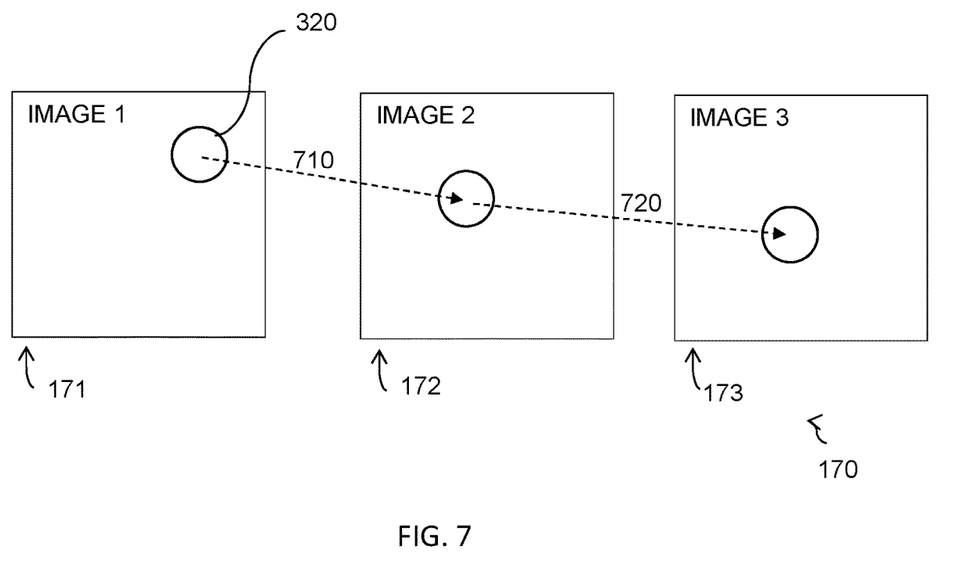
FIG. 7 is an illustration of a sequence of images generated by the apparatus of FIGS. 1 and 2.

FIG. 7 illustrates an object 320 in a plurality of images 171, 172, 173 forming an image sequence 170. The image sequence 170 comprises three images 171, 172, 173 although it will be realised that this is merely exemplary. The object 320, which may be a biological cell, moves in position between the images 171, 172, 173. An association is determined as a result of the method 400 between the object 320 in each of the images 171, 172, 173. A first association 710 is determined between the object in the first and second images 171, 172 and a second association 720 is determined between the object 320 in the second and third images 172, 173. The first and second associations may associated with an identifier. The identifiers may indicate that the association relates to the same object 320 i.e. to uniquely identify the object 320. The identifier may, in some embodiments, indicate a temporal order of the associations i.e. that the second association is later in time than the first association. For example, the identifier may be of the form: X-Y where X identifies the object and Y identifies an order of the association such as 1, 2 etc.

In certain embodiments it may be desirable to determine when an object enters the field of view of an image and/or leaves the field of view. Similarly, it may be desirable to determine when two or more objects combine into a single object and/or also when a single object splits or divides into two or more separate objects. This may be useful in embodiments where the objects are cells as division and/or combination events may occur.

In these embodiments, the confidences are calculated and associations are determined, as above, to identify objects in the image sequence. However, at some point an object will appear (i.e. the object's identifier will appear for the first time in an image of an image sequence) or disappear (i.e. the object's identifier will not appear in subsequent images of the image sequence) in the image sequence. In these embodiments detecting when and where objects appear and/or disappear may be achieved by evaluating the images of an image sequence by analysing the first image a first object appears in and the last image in which a second object appears. In other words, it is determined where an object association ends in the image sequence and where an object association begins in the image sequence.

Once the objects have been selected, further confidence calculations may be performed. These confidence calculations may be undertaken as described above. However only a subset of the characteristics may be used to calculate the confidence. Characteristics expected to change during a division or combination event, such as one or more of volume, radius, and area are not used for confidence calculations, as they are likely to either increase or decrease in value following such an event. For example, it is expected that where an object divides into two objects those will each have a smaller volume and/or radius than the previous, single, object. The characteristic confidences for each characteristic are then combined as above, potentially using a weighted geometric mean algorithm.

It will be appreciated that the characteristics which may change during a division or combination event are not limited to those listed above. Similarly, as above, other techniques may be used to produce characteristic confidence values for each characteristics as well as the total or combined confidence for each object.

Once one or more characteristic confidence calculations have been performed, it can be determined whether there is a relationship between the first and second objects. The relationship may be determined based upon whether the calculated total confidence exceeds a predetermined parent-daughter confidence threshold. The parent-daughter confidence threshold may be set by the user. If the total confidence exceeds the predetermined parent-daughter confidence threshold, then between the first and second objects an association is created as it is determined that the first and second objects represent the same object before or after a division or combination event. It will be appreciated that the in circumstances where a division or combination event has occurred there may be more than two daughter objects created from, or combined to create, a single parent object. Thus, in some circumstances, a single object in one image may be associated with two or more objects in a second, subsequent, image where the total confidence between the single object and each of the two or more objects in the second image exceeds the parent-daughter confidence threshold. This may be referred to as object descendancy.

Figure 5:
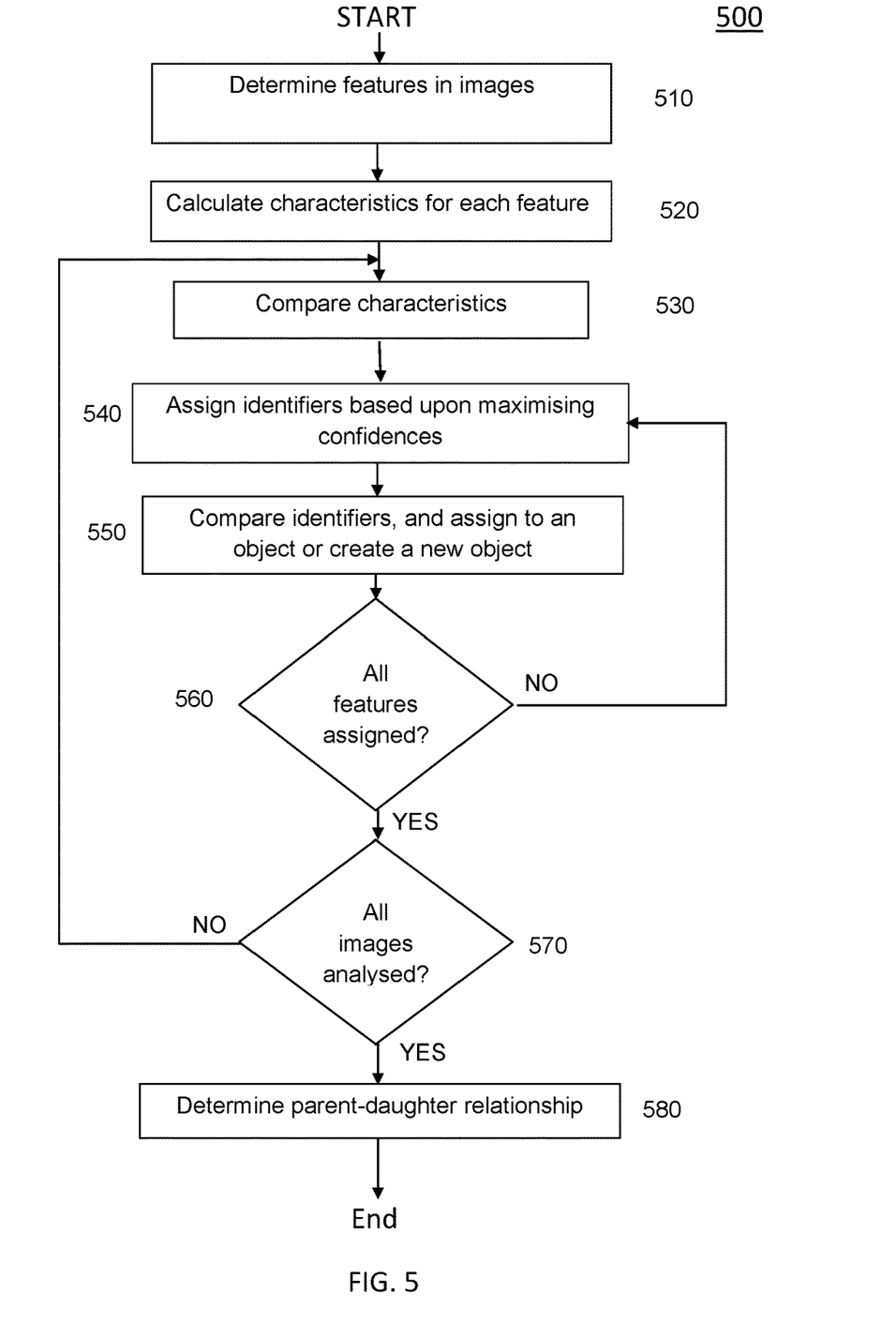
FIG. 5 is a flowchart illustrating a method according to an embodiment of the invention.

FIG. 5 is a flow chart illustrating a method 500 used in the determination of the temporal behaviour of an object according to a second embodiment of the invention. In the second embodiment, object descendancy is considered. That is, in some embodiments, an object may be determined to have more than one descendant. That is, an object in one image may be determined to be related to two or more objects in another image. The two or more objects may be considered to represent child objects which may be formed by division of the object into the two or more objects. Thus lineage of an object is envisaged in the method 500 according to the second embodiment.

As with the first embodiment 400, step 510 may comprise pre-processing to determine features in each of a plurality of images, such as image 171 and 172, of an image sequence 170 by segmenting the image. The segmenting may be performed by calculating a difference between background and foreground of the image. As a result, any features in the images are determined or identified.

Once the features in the image have been determined or identified, the method 500 proceeds to step 520 which comprises determining one or more characteristics of each feature. The characteristics may comprise a location of the feature, pixel value sum, area, average pixel value, radius and texture characteristics for the features. It will be appreciated that there are other characteristics which may be determined which are not listed.

Once the characteristics for features in the images of the image sequence have been determined, the method 500 proceeds to step 530. Step 530 comprises comparing one or more characteristics of a first feature in a first image, such as image 171, of the image sequence to characteristics of a second feature in a second image, such as image 172, of the image sequence by calculating one or more characteristic confidence values. The characteristic confidence values may be calculated by the techniques described above. A total confidence is then determined by, for example, a weighted geometric mean-algorithm. If the total confidence exceeds a predetermined confidence threshold, an association is created between the first and second features. A feature may be associated with a plurality of other features of further images of the image sequence if the total confidence value also exceeds the predetermined confidence threshold for the other features. Once the features in the image have one or more associations, the method 500 proceeds to step 540.

Step 540 comprises analysing the associations of a feature in the first and second images 171,172, to determine which associations are most likely based upon the calculated confidences. A technique based upon a combinatorial optimization algorithm may be used to an optimal or minimal association between features. The minimal association may be a one-to-one association of features in the first and second images 171, 172. One such technique is the Hungarian algorithm and in certain embodiments the Hungarian algorithm may be a Munkres algorithm.

Once the feature in an image of the image sequence has been assigned a single identifier the method 500 moves to step 550. Step 550 comprises determining if a feature in a first image 171 of the image sequence has the same association as a feature in second image 172 of the image sequence. If so both features are determined to represent the same object. If a feature does not appear to represent an already existing object (i.e. the identifier does not appear to represent a feature in previous images of the image sequence) it may be determined that the feature is new object in the image. Thus it is determined that the object appears for the first time in an image.

The method 500 then proceeds to step 560 which comprises determining whether further features in the image remain to be assigned to an object or determining whether further features need to be assigned as new objects. If so, the method 500 loops back to step 540 to repeat steps 540 and 550 of the method 500 to analyse the remaining features in the image and assign unique associations based upon maximising the confidence values. Once the features have been assigned identifiers and it has been determined whether they belong to an existing or a new object, the method 500 proceeds to step 570. Step 570 comprises determining whether further images in the image sequence remain to be analysed. If so, the method 500 loops back to step 530 where the method 500 repeats steps 530 to 560 of the method 500 and analyses a further image in the image sequence.

Once the images in the image sequence have been analysed, the method 500 proceeds to step 580. Step 580 comprises determining whether a parent-daughter relationship exists between two objects in images of the image sequence. The method of determining such a relationship is described above, wherein only characteristic confidence values not expected to change in a descendancy event (one of object combination or division) are used to determine a total or combined confidence value which is compared against the parent-daughter threshold confidence value.

Figure 6:
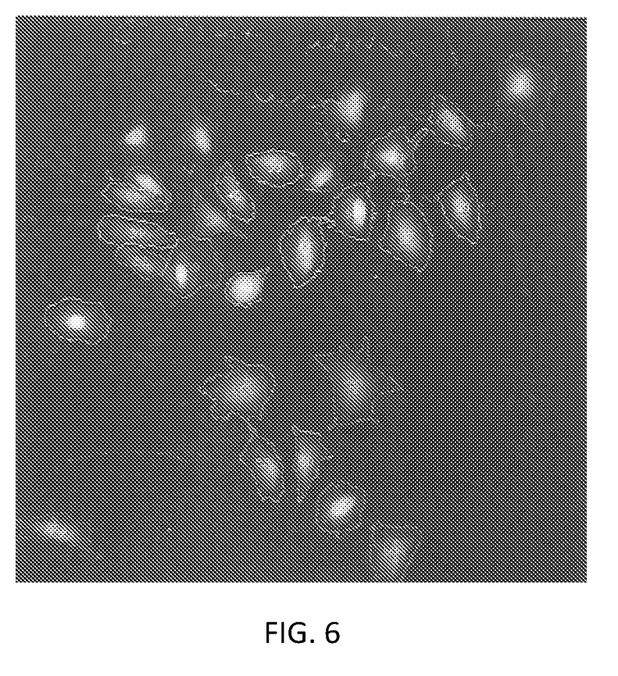
FIG. 6 shows an example of an image of the sequence represented by FIG. 3.

FIG. 6 is an example of an image of an image sequence, such as image sequence 170, resulting from an embodiment of the invention. The image shows an example in which numerous small and translucent objects, such as cells, have been identified, numbered and located by analysis of radiation reflected from or transmitted through the objects by an apparatus such as that described previously.

In certain embodiments of the invention the image data may be generated by a number of methods, one such method being the ptychographical iterative engine (PIE). WO 2005/106531, which is incorporated herein by reference for all purposes, discloses a method and apparatus of providing image data for constructing an image of a region of a target object. Incident radiation is provided from a radiation source at the target object. An intensity of radiation scattered by the target object is detected using at least one detector. The image data is provided responsive to the detected radiation. A method for providing such image data via an iterative process using a moveable softly varying probe function such as a transmittance function or illumination function is also disclosed. The methods and techniques disclosed in WO 2005/106531 are referred to as a PIE.

PIE provides for the recovery of image data relating to at least an area of a target object from a set of diffraction pattern measurements. Several diffraction patterns are recorded at a measurement plane using one or more detectors, such as a CCD or the like. A probe function, which might be a transmittance function associated with a post-target object aperture or an illumination function, must be known or estimated.

WO 2010/064051, which is incorporated herein by reference for all purposes, discloses an enhanced PIE (ePIE) method wherein it is not necessary to know or estimate the probe function. Instead a process is disclosed in which the probe function is iteratively calculated step by step with a running estimate of the probe function being utilised to determine running estimates of an object function associated with a target object.

Other methods of providing image data based on measurement of scattered radiation are also known.

In embodiments where the objects are cells, it may be difficult to use visible light as a method of generating image data due to the cell's properties. The use of a ptychographical method such as PIE or ePIE, or another quantitative phase imaging method, to evaluate the scattering and absorption of radiation other than light can help overcome and mitigate some of these problems, and as such may be useful when applying the method to identifying cells.

In certain embodiments, it may be possible to track the movement and behaviour of an object over a specified time period. The use of the associations enables links to be made between objects in in a plurality of images, such as image 171 and 172 of an image sequence 170. This allows the user to follow the movement of an object as well as any changes in its characteristics as time progresses.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of determining temporal behaviour of an object, comprising:
receiving image data comprising data representing a plurality of images, at least some of the images comprising one or more cells;
determining a plurality of characteristics of at least one feature in each of one or more of the plurality of images;
determining a confidence value representing a confidence that one of the cells in a first one of the plurality of images corresponds to a feature in a second one of the plurality images, wherein the confidence value is based upon the characteristics of the feature in the second image and the characteristics of the cell;
identifying the cell in the second one of the plurality of images based upon the confidence value; and
determining the confidence value based upon a ratio of a difference between the characteristic of the feature and a sum of the characteristic in the first and second images, wherein the confidence value is calculated according to:

$$conf = \left(1 + S_2 \left|\frac{characteristic_1 - characteristic_2}{characteristic_1 + characteristic_2}\right|^{S_1}\right)^{-1}$$

wherein conf is the confidence value, $S_1$ and $S_2$ are sensitivity factors and $characteristic_1$ and $chracteristic_2$ are values of the characteristic of the cell in the first image and the feature in the second image.

2. The method of claim 1, comprising:
    determining an association between the one of the cells in the first and the feature in the second image if said confidence exceed a predetermined confidence value.

3. The method of claim 1, wherein the characteristics are one or more of a pixel value sum, an area, an average pixel value, a radius, a circularity, a lateral position and texture characteristics.

4. The method of claim 3, wherein the texture characteristics are one or more of variance, curtosis and wavelet characteristics.

5. The method of claim 1, wherein the confidence value is based upon a plurality of characteristic confidence values each determined based upon a respective characteristic of the feature.

6. The method of claim 5, wherein the confidence value is determined by a weighted geometric mean calculation based on the plurality of characteristic confidence values.

7. The method of claim 6, where the weighted geometric mean calculation is of the form:

$$\text{totalConfidence} = (\Pi(\text{characteristicConfidence}^w))^{1/\Sigma w}$$

wherein:
    w is a respective weighting factor for each of the characteristic confidences.

8. The method of claim 1, comprising determining the confidence value based upon a temporal characteristic of the feature based upon a duration of time between the first and second images.

9. The method of claim 8, wherein the confidence value is inversely proportional to the duration of time.

10. The method of claim 1, wherein the confidence value is calculated according to:

$$\text{conf} = 1 - (S_T \times (|\text{frame}_1 - \text{frame}_2| - 1))$$

wherein conf is the confidence value $\text{frame}_1$ and $\text{frame}_2$ are frame numbers of the first and second images and $S_T$ is a sensitivity factor.

11. The method of claim 10, comprising setting conf to a predetermined value if the calculated confidence value is negative; optionally the predetermined value is 0.

12. The method of claim 1, comprising determining the confidence value based upon a positional characteristic of the feature based upon a distance between a position of the cell in the first image and the feature in the second image.

13. The method of claim 12, wherein the confidence value based upon the positional characteristic of the feature is based upon a size of the feature.

14. The method of claim 13, wherein the confidence value based upon the positional characteristic of the feature is based upon a ratio of a distance between the cell in the first image and the feature in the second image; optionally the confidence value is further based on the size of the feature.

15. The method of claim 12, wherein the confidence value is calculated according to:

$$\text{conf} = \left(1 + \left(\frac{d}{S_{p2}\bar{r}}\right)^{S_{p1}}\right)^{-1}$$

wherein conf is the confidence value, $\bar{r}$ is a mean radius of the feature, d is a distance between the position of the feature in the first and second images and $S_{p1}$ is a first sensitivity factor and $S_{p2}$ is a second sensitivity factor.

16. The method of claim 1, comprising determining a unique association between cell in the first image and the feature in the second image.

17. The method of claim 16, wherein the unique association is determined by maximising the confidence between features.

18. The method of claim 16, wherein the unique association is determined based upon a combinatorial optimization algorithm.

19. The method of claim 1, comprising determining whether a new cell is present in one of the plurality of images based upon the plurality of characteristics.

20. The method of claim 1, comprising determining whether a cell has divided into at least first and second cells.

21. The method of claim 20, wherein the determining whether the cell has divided is based upon a subset of the characteristics associated with the cell in the first image and at least one of first and second features in the second image.

22. The method of claim 21, wherein the determining whether the object has divided comprises determining a confidence value based upon the subset of characteristics of the cell in the first image and the subset of characteristics of at least one of the first and second features in the second image.

23. The method of claim 21, comprising determining an association between the cell in the first image and at least one of the first and second features in the second image if said confidence exceed a predetermined division confidence value.

24. The method of claim 1, comprising determining whether first and second cells have merged.

25. The method of claim 24, wherein the determining whether the first and second cells have merged is based upon a subset of the characteristics associated with the first and second cells in the first image and the feature in the second image.

26. The method of claim 25, comprising determining an association between at least one of the first and second cells in the first image and the feature in the second image if said confidence exceed a predetermined merge confidence value.

27. The method of claim 21, wherein the subset of characteristics is indicative of characteristics unrelated to object size.

28. The method of claim 1, wherein the cell is one of a single cell or a colony of cells; optionally the colony of cells comprises two or more cells.

29. The method of claim 1, wherein a feature comprises a plurality of pixels in the second image.

30. An apparatus for determining the temporal behaviour of objects, comprising:
    an image detection means arranged detect radiation emitted from a radiation source;
    a computing device comprising:
        a processor; and
        a memory;
        wherein the processor is arranged to perform a method according to claim 1.

31. A non-transitory computer-readable data storage medium having instructions stored thereon which, when executed by a computer, perform the method of claim 1.

* * * * *